(12) United States Patent
Sasaki

(10) Patent No.: US 8,078,067 B2
(45) Date of Patent: Dec. 13, 2011

(54) OPTICAL RECEIVING APPARATUS

(75) Inventor: Shinya Sasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 12/418,107

(22) Filed: Apr. 3, 2009

(65) Prior Publication Data

US 2009/0257758 A1 Oct. 15, 2009

(30) Foreign Application Priority Data

Apr. 11, 2008 (JP) .................................. 2008-103149

(51) Int. Cl.
*H04B 10/06* (2006.01)
(52) U.S. Cl. ......... 398/212; 398/155; 398/161; 398/162
(58) Field of Classification Search .................. None
See application file for complete search history.

(56) References Cited

U.S. PATENT DOCUMENTS

| | | | |
|---|---|---|---|
| 7,477,848 B2 | 1/2009 | Ooi et al. | |
| 7,877,025 B2* | 1/2011 | Tao et al. ...................... | 398/209 |
| 2004/0081470 A1 | 4/2004 | Griffin | |
| 2007/0047954 A1 | 3/2007 | Mamyshev | |
| 2007/0064845 A1 | 3/2007 | Phanse et al. | |
| 2007/0292140 A1 | 12/2007 | Terayama et al. | |
| 2007/0297804 A1* | 12/2007 | Honda et al. .................. | 398/147 |
| 2008/0031633 A1 | 2/2008 | Hoshida et al. | |
| 2008/0056733 A1* | 3/2008 | Isomura et al. ............... | 398/209 |
| 2008/0253761 A1* | 10/2008 | Mizuguchi et al. ............ | 398/17 |
| 2009/0196610 A1* | 8/2009 | Isomura et al. ............... | 398/65 |
| 2009/0244685 A1* | 10/2009 | Hoshida et al. ............... | 359/279 |
| 2009/0257756 A1* | 10/2009 | Fukumitsu .................... | 398/202 |

FOREIGN PATENT DOCUMENTS

| | | |
|---|---|---|
| EP | 1 868 305 A1 | 12/2007 |
| EP | 2 007 038 A2 | 12/2008 |
| JP | 2004-516743 A | 6/2004 |
| JP | 2007-20138 A | 1/2007 |
| JP | 2007-60583 A | 3/2007 |
| JP | 2007-181171 A | 7/2007 |

OTHER PUBLICATIONS

K. Shimomura et al., A Performance Stabilized 40Gb/s CS-RZ DPSK Transponder for Transoceanic WDM Transmission Systems, Kloosterstraat 5 9960 Assenede Belgium, 2003, 2 pages, XP040380061.

(Continued)

*Primary Examiner* — Kennneth N Vanderpuye
*Assistant Examiner* — Rajsheed Black-Childress
(74) *Attorney, Agent, or Firm* — Mattingly & Malur, PC

(57) ABSTRACT

In an optical receiving apparatus for receiving an optical DQPSK signal, a phase difference between both arms of an optical interferometer is controlled to an optimum value. The optical DQPSK signal is incident on two optical interferometers in each which a delay-time difference between two arms is set to be equal to a 1-symbol time of the optical DQPSK signal and which are orthogonal to each other. The optical receiving apparatus converts the optical DQPSK signal into an intensity signal and receives it. A differential amplifier obtains a difference signal between outputs of a pre-amplifier and a discriminator connected thereto. The difference signal includes, as an amplitude, a phase shift in a phase section. A control circuit adjusts the phase of the phase section in the optical interferometers to reduce this difference signal, and changes the phase difference between the two arms to a desired phase difference.

12 Claims, 9 Drawing Sheets

OTHER PUBLICATIONS

Ho, The Effect of Interferometer Phase Error on Direct-Detection DPSK and DQPSK Signals, IEEE Photonics Technology Letters, vol. 16, No. 1, Jan. 2004, pp. 308-310.

Lize et al., Phase-Tunable Low-Loss, S-, C-, and L-Band DPSK and DQPSK Demodulator, IEEE Photonics Technology Letters, vol. 19, No. 23, Dec. 1, 2007, pp. 1886-1888.

* cited by examiner

| Θ | <V+> | <V-> |
|---|---|---|
| 0 | +0.5 | +0.5 |
| +π/2 | +0.5 | -0.5 |
| +π | -0.5 | -0.5 |
| +3π/2 | -0.5 | +0.5 |

OPTICAL RECEIVING APPARATUS

CLAIM OF PRIORITY

The present application claims priority from Japanese patent application JP 2008-103149 filed on Apr. 11, 2008, the content of which is hereby incorporated by reference into this application.

BACKGROUND OF THE INVENTION

1. Field of the Invention

The present invention relates to an optical receiving apparatus, and particularly to an optical receiving apparatus for receiving an optical differential quaternary phase shift keying (DQPSK) signal in an optical fiber communication system, and more particularly to an optical receiving apparatus which can control optical characteristics of two optical interferometers installed in the inside of the optical receiving apparatus to provide the optimum state for reception.

2. Description of the Related Application

A present optical communication system uses a binary modulation and demodulation technologies using light intensity. Specifically, a transmission side converts "0" and "1" of digital information into ON and OFF of light intensity, and transmits it to an optical fiber. A reception side photoelectric-converts the light propagating through the optical fiber and restores the original information. In recent years, with remarkable popularization of the Internet, the transmission capacity requested to the optical communication system is extremely increased. The increase of the transmission capacity is dealt with by raising the speed of ON and OFF of light, that is, the modulation speed. However, in general, the method of realizing the large capacity by raising the modulation speed has matters as described below.

First, in order to turn on and off the light, a new electric device and a new optical device capable of performing at ultra-high speed are required. There is a matter that cost and time are required to develop the new devices. There is also a matter that when the modulation speed is raised, the transmittable distance limited by the chromatic dispersion of an optical fiber becomes short. In general, when a bit rate is doubled, the transmission distance limited by the chromatic dispersion becomes ¼. Similarly, there is also a matter that when the modulation speed is raised, the transmittable distance limited by the polarization mode dispersion of an optical fiber becomes short. In general, when the bit rate is doubled, the transmission distance limited by the polarization mode dispersion becomes ½.

Then, recently, as an optical modulation and demodulation system to increase the transmission capacity, modulation and demodulation systems using the phase of light, not the related art binary modulation of the light intensity, are studied. Among them, quaternary phase shift keying (QPSK) particularly receives attention since it has following features. That is, in the QPSK, since a symbol rate is half a bit rate, the ultra-high speed electric device or the optical device operating at the bit rate, which is required in the related art binary modulation of light intensity, is not required. Besides, in the case of the QPSK, the communication distance limited by the chromatic dispersion of the optical fiber can be extended four times longer than that of the related art binary modulation system of the light intensity, and the communication distance limited by the polarization mode dispersion is extended two times longer than that of the binary modulation system of the light intensity. Thus the QPSK has also a feature that it is suitable for long distance communication. Incidentally, a specific modulation and demodulation system of the QPSK is disclosed in patent document 1.

Among the QPSK, differential quaternary phase shift keying (DQPSK) using differential coding has a simple receiver structure and therefore, it receives attention. In the DQPSK signal, the phase of light is made to correspond to $\pi/4$, $3\pi/4$, $5\pi/4$ or $7\pi/4$ correspondingly to a set of two differentially coded bits, that is, (0,0), (1,0), (1,1) or (0,1). At the reception side, the optical DQPSK signal transmitting through the optical fiber is branched into two, and in order to perform differential decoding, the signals are made to pass through two optical interferometers, which are set so that a delay-time difference between two arms in each of the interferometers becomes a 1-symbol time of the DQPSK, and are converted into intensity signals, and these are converted into electric signals and are received. Besides, the respective phase differences between both the arms of the two optical interferometers are set to $+\pi/4$ and $-\pi/4$. As compared with the receiver of the QPSK, the receiver of the DQPSK has features that a local oscillator light source is not required, and it is not necessary to adopt a polarization-diversity-receiver configuration, and the number of receivers is halved. As a result, a low cost optical receiving apparatus can be realized.

As stated above, in the receiver of the optical DQPSK signal, it is necessary to set the phase differences between both the arms of the optical interferometers to $+\pi/4$ and $-\pi/4$. However, in the optical interferometer, the phase difference is shifted from $\pm\pi/4$ due to the ambient temperature or aging of parts constituting the interferometer. This phase shift causes deterioration of reception sensitivity. For example, according to non-patent document 1, when the phase difference is shifted from the optimum phase difference by 6 degrees ($=\pi/30$), the sensitivity is deteriorated by 1 dB. In a generally used optical interferometer, by the temperature dependency of refractive index of a material forming an optical waveguide and the temperature dependency determined by the linear expansion coefficient of an optical waveguide substrate, when the temperature rises, the optical path length is extended, and when the temperature is lowered, the optical path length is shortened. Accordingly, the phase difference of two arms of the optical interferometer becomes large by the rise of temperature, and the phase difference becomes small by the lowering of temperature. With respect to a structure in which a heater is attached to an optical interferometer used in a receiver of an optical DQPSK signal, and a difference between optical path lengths of two arms is adjusted to set a phase difference to a desired value, an example thereof is disclosed in, for example, non-patent document 2.

That the phase difference is sensitive to the temperature means that there can occur a case where a once set phase difference is shifted from the optimum value by the influence of ambient temperature. Further, by aging of the heater or the like, a desired amount of heat comes not to be generated with the lapse of time, and consequently, the phase difference is shifted from the optimum value with the lapse of time.

As a technique to control and to minimize the shift of the phase difference from the optimum value, there is a technique disclosed in, for example, patent document 2, patent document 3 or patent document 4.

In the technique of the patent document 2, for example, an eye opening monitor is provided in a receiver, an average value, a minimum value or a maximum value of a distribution of signal amplitude is obtained, and the phase of an arm at one side of an optical interferometer is controlled so that the average value becomes maximum, the maximum value becomes minimum, or the minimum value becomes maximum. In the technique of the patent document 3, for example, a preamplifier output is squared (or full rectified), and the phase of the optical interferometer is controlled so that the low frequency component of the signal becomes minimum. In the technique of the patent document 4, for example, preamplifier outputs of I and Q branches are respectively multiplied by outputs of data regenerators of the Q and I branches, and the low frequency signal component is used to control the optical interferometer.

[Patent document 1] JP-T-2004-516743
[Patent document 2] JP-A-2007-181171
[Patent document 3] JP-A-2007-60583
[Patent document 4] JP-A-2007-20138
[Non-patent document 1] Keang-Po Ho, "The Effect of Interferometer Phase Error on Direct-Detection DPSK and DQPSK Signals", IEEE Photonics Technology Letters, Vol. 16, No. 1, 308 (2004)
[Non-patent document 2] Yannick Keith Lize, et al, "Phase-Tunable Low-Loss S-, C-, and L-Band DPSK and DQPSK Demodulator", IEEE Photonics Technology Letters, Vol. 19, No. 23, 1886 (2007)

SUMMARY OF THE INVENTION

However, in the technique of the patent document 2, the ultra-high speed sampling circuit (such as a measuring equipment) is required in addition to a normal receiver structure, and the increase of the cost of the receiver can not be avoided. Besides, in the technique of the patent document 3, since the square circuit (or full-wave rectifying circuit) is used, the influence of a noise included in the received signal or the waveform distortion by optical fiber transmission is liable to become serious. Further, in the technique of the patent document 4, since the optical interferometer is controlled by using the signals of the I and Q branches, when the signal of the one branch is deteriorated (power fluctuation, waveform distortion), the control of the other branch is influenced. Besides, the adjustment and testing of the respective branches at the time of manufacture can not be independently performed, and the adjustment and testing are difficult.

As a system in which the phase difference between both arms of each of two optical interferometers used in the inside of a receiving apparatus of an optical DQPSK signal is controlled to an optimum value, a control system is required which can be realized at low cost without using a measuring equipment operating at ultra-high speed or the like to the utmost and does not receive the influence of waveform distortion due to optical fiber transmission to the utmost, and in which the controls of the two optical interferometers operate independently of each other.

In view of the above, it is an object of the present invention to control optical characteristics of two optical interferometers, which are installed in an optical receiving apparatus, to provide an optimum state for reception. It is another object of the invention to construct a stable communication system in which a reception operation of an optical DQPSK signal becomes stable and high sensitivity reception can be realized.

Besides, it is another object of the invention to provide an optical receiving apparatus which has low cost and does not receive an influence of waveform distortion to the utmost and in which controls of phase differences of two optical interferometers operate independently of each other, and a control system of the optical interferometers.

The objects can be realized by taking a difference between an output of a pre-amplifier incorporated in an optical receiving apparatus and an output of a discriminator having a threshold to discriminate at a zero level or a clock and data regenerator, generating a control signal from a signal of the difference, and controlling a phase section of an optical interferometer so as to minimize this signal.

Hereinafter, the principle thereof will be described in more detail with reference to FIG. 1. Incidentally, the structure of the apparatus will be described later in detail. An optical DQPSK signal 1 passing through an optical fiber as a transmission path from an optical transmitter and incident on an optical receiving apparatus 100 is branched into two by an optical coupler 10 and they are incident on optical interferometers 20 and 30, respectively. The outputs of the optical interferometers 20 and 30 are converted into electric signals by balanced photoelectric conversion elements 13 and 14, and the electric signals are amplified by pre-amplifiers 15 and 16, respectively. The outputs are respectively extracted as digital signals by discriminators or clock and data regenerators (hereinafter simply referred to as discriminators) 17 and 18. It is assumed that a phase difference between both arms of each of the optical interferometers 20 and 30 is set to an optimum value, that is, a phase difference between both the arms of the one optical interferometer is set to $+\pi/4$, and a phase difference between both the arms of the other optical interferometer is set to $-\pi/4$ (these are the optimum values). In this case, an output signal $<V+>$ of the pre-amplifier 15 and an output signal $<V->$ of the pre-amplifier 16 can be expressed by following expressions.

[Numerical expression 1]

$$<V+>=\cos(\theta-\pi/4)/\sqrt{2}, <V->=\cos(\theta+\pi/4)/\sqrt{2} \quad (1)$$

Where $\theta$ denotes a phase difference between a phase of light of an optical DQPSK signal and a phase of light of an optical DQPSK signal at a time 1 symbol before, and $<V+>$ and $<V->$ denote values of output voltages V+ and V− of the pre-amplifiers 15 and 16 in the case where the phase difference of the optical interferometer is set to the optimum value. In the expression (1), in order to simplify the expression, it is assumed that $R \cdot ZT=1$ is established (that is, normalization is performed by $R \cdot ZT$). Where R denotes the conversion coefficient of the balanced photoelectric conversion elements 13 and 14, and ZT denotes the transimpedance of the pre-amplifiers 15 and 16.

Since the phase of the optical DQPSK signal takes a value of one of $\pi/4$, $3\pi/4$, $5\pi/4$ and $7\pi/4$, the phase difference $\theta$ between the optical DQPSK signal and the optical DQPSK signal at the time 1 symbol before becomes a value of one of 0, $\pi/2$, $\pi$ and $3\pi/2$. Accordingly, the output signals $<V+>$ and $<V->$ of the pre-amplifiers 15 and 16 in the case where the phase difference between both the arms of the optical interferometer is set to the optimum value take values shown in FIG. 9. When the output signal of the pre-amplifier 15, 16 is inputted to the discriminator 17 or 18 in which the threshold is set to 0, the output becomes the same value as that of the pre-amplifier, that is, the value of FIG. 9.

Here, consideration is given to a case where the phase difference between both the arms of each of the optical interferometers 20 and 30 is shifted from $\pm\pi/4$ of the optimum value by the change of ambient temperature or the aging. For example, consideration is given to a case where the phase difference of the one optical interferometer 20 is shifted from $+\pi/4$ to $+\pi/4+\epsilon$, and the phase difference of the other optical interferometer 30 is shifted from $-\pi/4$ to $-\pi/4+\mu$. In this case, the outputs of the pre-amplifiers 15 and 16 are respectively expressed by following expressions.

[Numerical expression 2]

$$V+=\cos(\theta-\pi/4-\epsilon)/\sqrt{2}, V-=\cos(\theta+\pi/4-\mu)/\sqrt{2} \quad (2)$$

Here, in the case where $\epsilon$ and $\mu$ are sufficiently small and first-order approximation is established, when the expression (2) is developed by the addition theorem and first-order approximation is performed, V+ and V− can be expressed as follows. For example, here, the approximation of cos $\epsilon$=1 and sin $\epsilon$=$\epsilon$ is performed.

[Numerical expression 3]

$$V+ = <V+> - \epsilon \cdot <V->, \quad V- = <V-> + \mu \cdot <V+> \quad (3)$$

FIG. 3 shows an example of the output signals V+ and V− of the pre-amplifiers.

In FIG. 3, the horizontal axis indicates the time, and as an example, the output signals obtained when the phase difference takes respective patterns are shown. Besides, the vertical axis indicates the output of the pre-amplifier 15, 16. Here, a solid line indicates the output V+ of the pre-amplifier 15, and a broken line indicates the output V− of the pre-amplifier 16. Incidentally, FIG. 3 is obtained by the expression (3) and FIG. 9. It is understood that V+ and V− have values shifted by $\epsilon$ or $\mu$ from <V+> and <V−> in the case where the phase difference between both the arms of each of the optical interferometers 20 and 30 is the optimum value.

On the other hand, when $\epsilon$ and $\mu$ are small, the outputs of the discriminators 17 and 18 are coincident with the values shown in FIG. 9, that is, <V+> and <V−>. Thus, when a difference between the output signal (expression 3) of the pre-amplifier 15, 16 and the output signal of the discriminator is taken by a differential amplifier 11 or 12, $\epsilon \cdot$<V−> and $\mu \cdot$<V+> signals are respectively obtained. That is, the output signals of the differential amplifiers 11 and 12 include information of the shifts $\epsilon$ and $\mu$ of the phase differences of the optical interferometers 20 and 30 from the optimum values.

FIG. 4 shows an example of the output signal of the differential amplifier.

It is understood that the output signal of each of the differential amplifiers 11 and 12 is a signal oscillating with an amplitude $\epsilon$ or $\mu$ and around 0 V. This signal is used, and when a current or voltage applied to a phase section 22, 32 of the optical interferometer 20, 30 is changed by a control circuits 40, 50 so that the signal becomes minimum, the temperature of a heater in the phase section 22, 32 is changed, and the control is performed so that the shift of the phase difference from the optimum value becomes minimum.

According to the first solving means of this invention, there is provided an optical receiving apparatus for receiving an optical differential quaternary phase shift keying signal, comprising:

an optical interferometer that includes a delay section to give a delay time to one arm of two arms through which part of inputted optical differential quaternary phase shift keying signal passes, and a phase section to give a phase difference between signals of the two arms by adjusting a phase of the one arm or the other arm;

a photoelectric conversion element to convert an optical signal from the optical interferometer into an electric signal and to output the electric signal;

a discriminator to reproduce a digital signal based on the electric signal and a previously determined threshold and to output the digital signal;

a difference unit to obtain a difference signal between an input to the discriminator and an output of the discriminator; and a control circuit to adjust the phase given by the phase section to reduce an amplitude of the obtained difference signal.

According to the second solving means of this invention, there is provided an optical receiving apparatus for receiving an optical differential quaternary phase shift keying signal, comprising:

an optical interferometer that includes a delay section to give a delay time to one arm of two arms through which part of the inputted optical differential quaternary phase shift keying signal passes, a phase section to give a previously determined phase difference between signals of the two arms, and a phase adjustment section to adjust a phase of the signal of the arm different from the phase section;

a photoelectric conversion element to convert an optical signal from the optical interferometer into an electric signal and to output the electric signal;

a discriminator to reproduce a digital signal based on a level of the electric signal and to output the digital signal;

a difference unit to obtain a difference signal between an input to the discriminator and an output of the discriminator; and a control circuit to adjust the phase given by the phase section to reduce an amplitude of the obtained difference signal.

According to the invention, the optical characteristics of the two optical interferometers installed in the receiving apparatus can be controlled to provide the state optimum for reception. Besides, according to the invention, the reception operation of the optical DQPSK signal becomes stable, the high sensitive reception can be realized, and the stable communication system can be constructed. Besides, according to the invention, the optical receiving apparatus can be realized which has low cost and in which controls of the two optical interferometers are independent of each other, and the control not much dependent on the distortion of the optical waveform after the transmission can be performed.

BRIEF DESCRIPTION OF THE DRAWINGS

Figure 9:
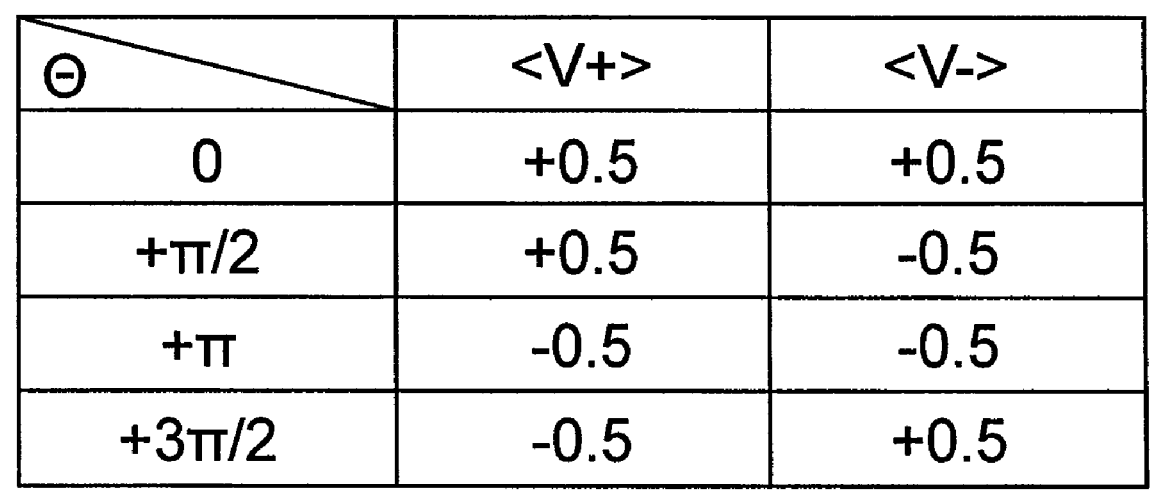

FIG. 9 is an explanatory view of an output of a pre-amplifier in a case where a phase difference between both arms of an optical interferometer is an optimum value.

DETAILED DESCRIPTION OF THE INVENTION

Embodiments of the present invention will be described with reference to the drawings.

1. First Embodiment

Figure 1:
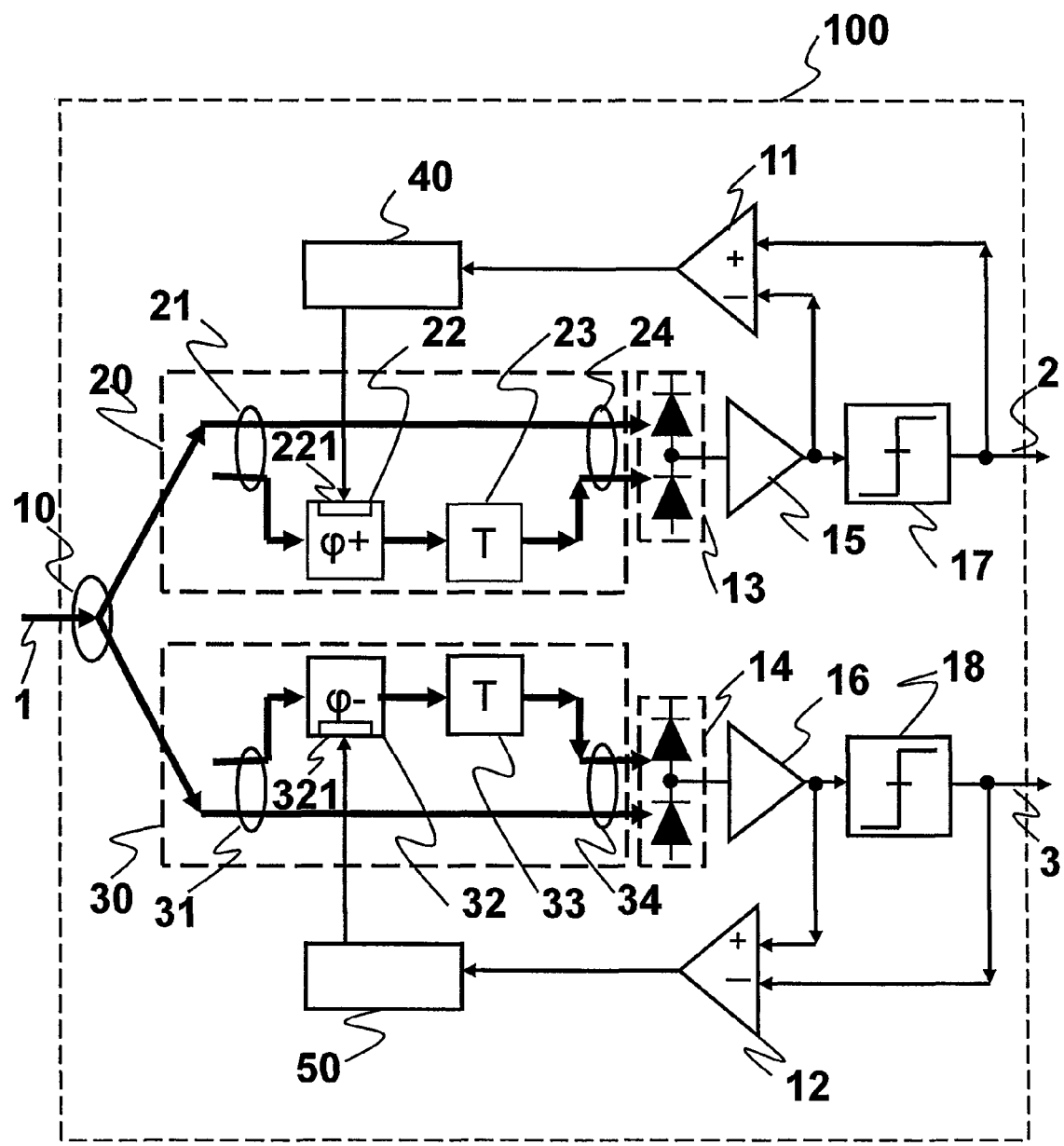
FIG. 1 is a block diagram showing a structure of an optical receiving apparatus of a first embodiment.

First, a first embodiment will be described. FIG. 1 is a block diagram showing a structure of an optical receiving apparatus of a first embodiment.

An optical receiving apparatus 100 includes, for example, an optical coupler (branching unit) 10, optical interferometers 20 and 30, balanced photoelectric conversion elements 13 and 14, pre-amplifiers 15 and 16, discriminators or clock and data regenerators 17 and 18, differential amplifiers 11 and 12, and control circuits 40 and 50. The optical interferometers 20 and 30 respectively include optical couplers 21 and 31, phase sections 22 and 32, delay sections 23 and 33, and optical couplers 24 and 34.

An optical DQPSK signal 1 passing through an optical fiber as a transmission path from an optical transmitter and incident on the optical receiving apparatus 100 is branched into two by the optical coupler 10, and they are incident on the optical interferometers 20 and 30, respectively. Hereinafter, a signal path passing through the optical interferometer 20 is called an I system, and a signal path of the optical interferometer 30 is called a Q system.

The flow of a signal of the I system will be described next. The optical signal incident on the optical interferometer 20 is branched into two by the coupler 21, and they pass through both arms of the optical interferometer 20 and are combined by the optical coupler 24. Thereafter, the optical signal is converted into an electric signal by the balanced photoelectric conversion element 13, and is amplified by the pre-amplifier 15. The electric signal is reproduced as a digital signal by the discriminator in which the threshold is set to 0V or the clock and data regenerator (so-called CDR circuit) 17. The flow of a signal of the Q system is the same as the flow of the signal of the I system.

In the inside of the optical interferometers 20 and 30, in order to realize the so-called delay detection operation, the delay section 23, 33 to give a delay-time difference T between both arms of each of the optical interferometers 20 and 30 is located on one of the arms. The delay-time difference T is set to be equal to a 1-symbol time in the case of the optical DQPSK signal. Besides, although a Mach-Zehnder interferometer or a Michelson interferometer can be used as the optical interferometer 20, 30, the optical interferometer is often formed of a free space optics using a bulk optical element or an optical fiber or an optical waveguide formed on a silica substrate.

In the case where the optical DQPSK signal is received, the optimum value of the phase difference between both arms of the optical interferometer 20 of the I system and the optimum value of the phase difference between both arms of the optical interferometer 30 of the Q system are $+\pi/4$ and $-\pi/4$, respectively. In order to realize this phase difference, the phase section 22, 32 is located on the one arm of each of the optical interferometers. In the phase section 22, 32, a heater 221, 321 is provided at a part of an optical waveguide or an optical fiber. The optical path length is changed by the heat generated in the heater 221, 321 and by the temperature dependency of the refractive index of the waveguide or the thermal expansion of the waveguide substrate, and consequently, the phase difference between both the arms can be changed. In general, when the temperature of the waveguide is raised by the heater 221, 321, the optical path length is extended and the refractive index is increased, so that the phase difference between both the arms is increased. On the other hand, when the temperature is lowered, the optical path length is shortened and the refractive index is reduced, so that the phase difference between both the arms is decreased. Incidentally, in this embodiment, although the heater is used, an appropriate phase adjustment unit to change the optical path length of a signal passing through an arm and to change the phase difference between both the arms may be used in addition to the heater. When an optical communication system is operated, a voltage (or current) to realize a suitable phase difference is applied to the phase section 22, 32 of the optical interferometer 20, 30.

Figure 4:
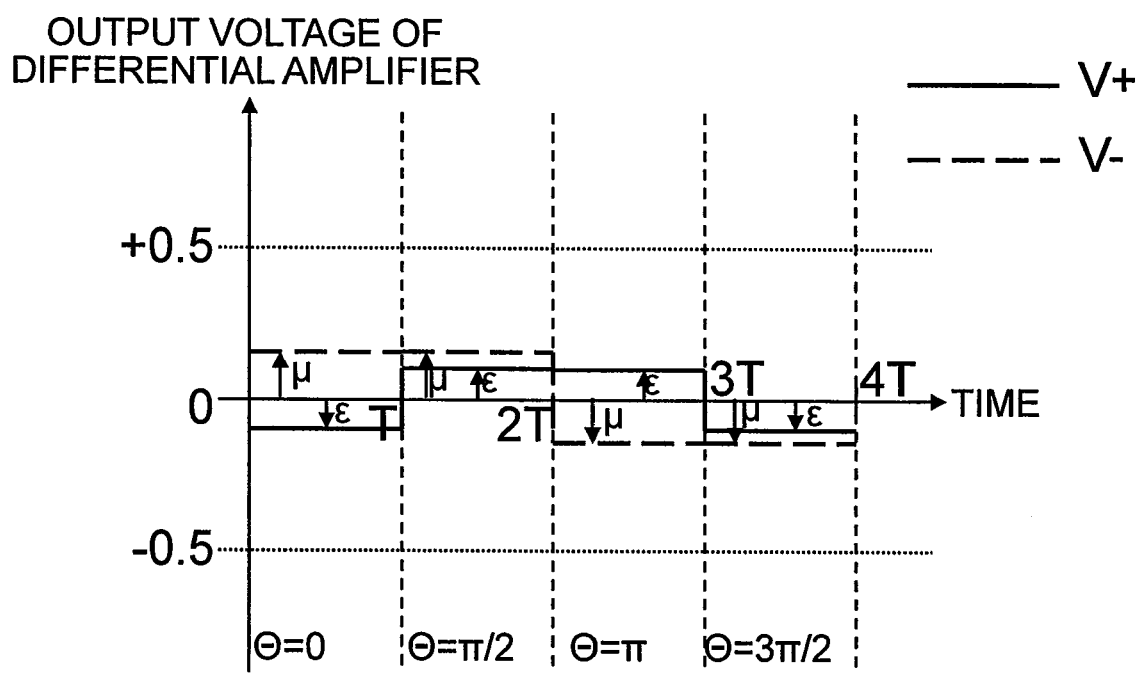
FIG. 4 is an explanatory view of an output of a differential amplifier to which an output of a pre-amplifier and an output of a discriminator are inputted.

Next, the control of this phase section 22 will be described. A difference between the output (input of the discriminator 17) of the pre-amplifier 15 of the I system of the optical receiving apparatus 100 and the output of the discriminator 17 is extracted by the differential amplifier 11. As stated above, when the phase of the phase section 22 is changed by the ambient temperature or the aging, and the phase difference between both the arms of the optical interferometer 20 is shifted from the optimum value $+\pi/4$, this difference signal is changed at symbol speed, and the amplitude thereof is proportional to the shift $\epsilon$. An example thereof is shown in FIG. 4. The output signal (difference signal) of the differential amplifier 11 changes the control voltage (or control signal such as control current) to the phase section 22 of the optical interferometer by the control circuit 40 so that this signal becomes minimum (or becomes small). In accordance with the control signal, the phase section 22 adjusts the phase by the heater 221, and optimizes the phase difference between both the arms. Since the output of the differential amplifier 11 is proportional to the shift $\epsilon$ from $+\pi/4$ of the optimum value of the phase difference between both the arms of the optical interferometer 20, the control to minimize this signal becomes the control to approximate the phase difference between both the arms of the optical interferometer 20 to $+\pi/4$, and the desired characteristic of the optical interferometer 20 can be kept.

The above is the control operation of the phase section 22 of the I system, and the operation of the phase section 32 of the Q system is the same as the operation of the I system. However, there is one different point between the control operation of the I system and the control operation of the Q system. As is understood from the expression (3), the signs of the phase shifts $\epsilon$ and $\mu$ are opposite to each other. Thus, in the control of the phase section 22, 32, as shown in FIG. 1, in the differential amplifier 11 of the I system, the output of the pre-amplifier 15 is subtracted from the output of the discriminator 17, whereas in the differential amplifier 12 of the Q system, the output of the discriminator 18 is subtracted from the output of the pre-amplifier 16.

Figure 5:
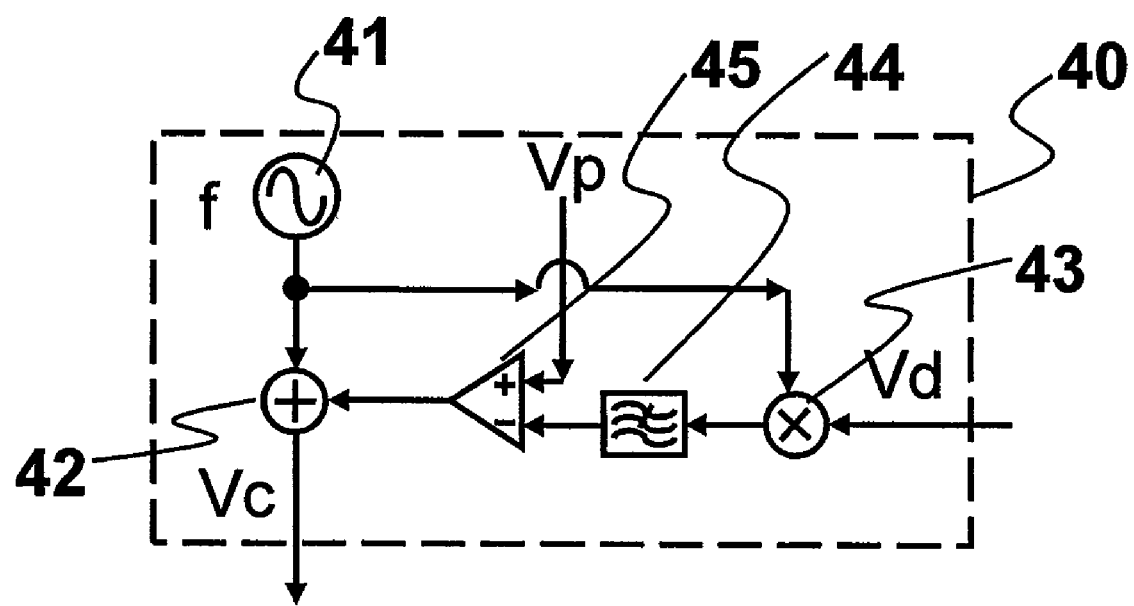
FIG. 5 is a structural view (1) of a control circuit.

FIG. 5 is a block diagram showing one of structural examples of the control circuits 40 and 50. A specific structural example of the control circuits 40 and 50 will next be described. In the following, although the signal of the I system is described, the same applies to the case of the Q system.

The control circuit 40 includes, for example, an oscillator 41, an adding circuit 42, a mixer 43, a low-pass filter 44, and a difference circuit 45. The oscillator 41 outputs a signal of a previously determined frequency f. A synchronous detection circuit including the mixer 43 and the low-pass filter 44 inputs a difference signal Vd including the oscillation component of the frequency f from the differential amplifier 11, performs synchronous detection based on the output from the oscillator 41, and extracts the frequency component from the difference signal Vd. For example, the mixer 43 multiplies the difference signal Vd by the output from the oscillator 41, and the low-pass filter performs filtering at the previously determined frequency. The difference circuit 45 takes a difference between a signal Vp for giving the previously determined phase difference ($+\pi/4$) and the output of the low-pass filter 44. The adding circuit 42 adds the difference result of the difference circuit 45 to the signal from the oscillator 41, and generates a control signal Vc to the phase section 22.

This control circuit 40 uses a so-called dithering system, and includes the oscillator 41 in the control circuit. The oscillation frequency f is sufficiently lower than the symbol speed of the optical DQPSK signal and is sufficiently higher than the fluctuation of the ambient temperature. For example, when the symbol speed is made 21.5 Gigasymbols per second, the frequency f can be made 20 Megahertz. The output of the oscillator 41 is added to the voltage Vp as the DC bias, and is applied as the control signal Vc to the phase section 22 of the optical interferometer 20. Here, the voltage VP is the initial set voltage by which the heater 221 of the phase section 22 is heated, and the phase difference between both the arms of the optical interferometer 20 is correctly set to $+\pi/4$. Since the signal of the frequency f is superposed on this voltage VP, when the signal amplitude of this frequency f is sufficiently small as compared with the voltage Vp, the heat generation at the phase section 22 oscillates at the frequency f. Accordingly, the phase difference between both the arms of the optical interferometer 20 also oscillates at the frequency f and around $+\pi/4$. The amplitude of the oscillation of the phase difference corresponds to the shift $\epsilon$ of FIG. 4. Accordingly, the phase difference component oscillating at the frequency f is included in the output signal Vd of the differential amplifier 11. This can be extracted by the mixer 43 and the low-pass filter 44 installed in the control circuit 40 and by the synchronous detection system of the frequency f. Incidentally, the cut-off frequency of the low-pass filter 44 is f or less. Since the extracted signal is proportional to the amplitude of the oscillation of the phase difference of the optical interferometer 20, in order to reduce the signal, that is, by subtracting the signal from the voltage Vp so that the amount of heat generation in the heater section 221 is controlled. By this, independently of the ambient temperature or the aging, the phase difference between both the arms of the optical interferometer can be stabilized to $+\pi/4$.

Although the description of the control circuit 40 is made while using the signal of the I system, the same structure can also be adopted for the control circuit 50.

Figure 6:
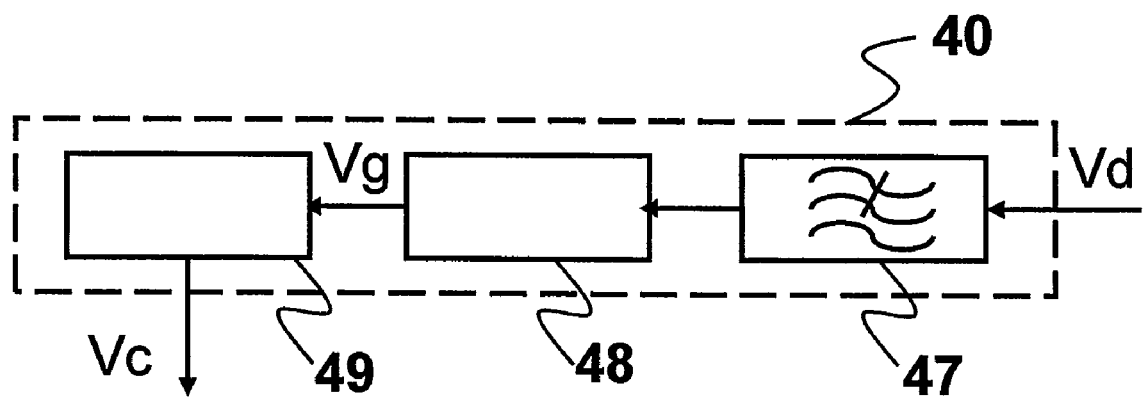
FIG. 6 is a structural view (2) of a control circuit.

FIG. 6 shows another structural example of the control circuit.

The control circuit 40 includes, for example, a low-pass filter 47, a microwave detector 48, and a controller 49. The control circuit 40 inputs the output signal Vd of the differential amplifier 11, and causes it to pass through the low-pass filter 47 in order to extract the fluctuation component of the signal not higher than the symbol speed. The cut-off frequency of the low-pass filter 47 is the symbol speed or less. For example, when the symbol speed is 21.5 Gigasymbols per second, the cut-off frequency is made 2 Gigahertz. The output of the low-pass filter 47 is converted into a DC voltage (DC signal) Vg by the microwave detector 48. The DC voltage Vg is proportional to the electric power of the high frequency (high frequency not higher than the cut-off frequency of the low-pass filter 47) component of the signal shown in FIG. 4. That is, as the phase difference between both the arms of the optical interferometer 20 is shifted from $+\pi/4$, the value of Vg becomes large. The DC voltage Vg is inputted to the controller 49, and the controller 49 generates a control signal Vc so that Vg becomes small. The control signal Vc is applied to the phase section 22, and the phase difference between both the arms of the optical interferometer 20 is stabilized to $+\pi/4$. This control system is so-called minimum value control.

Figure 7:
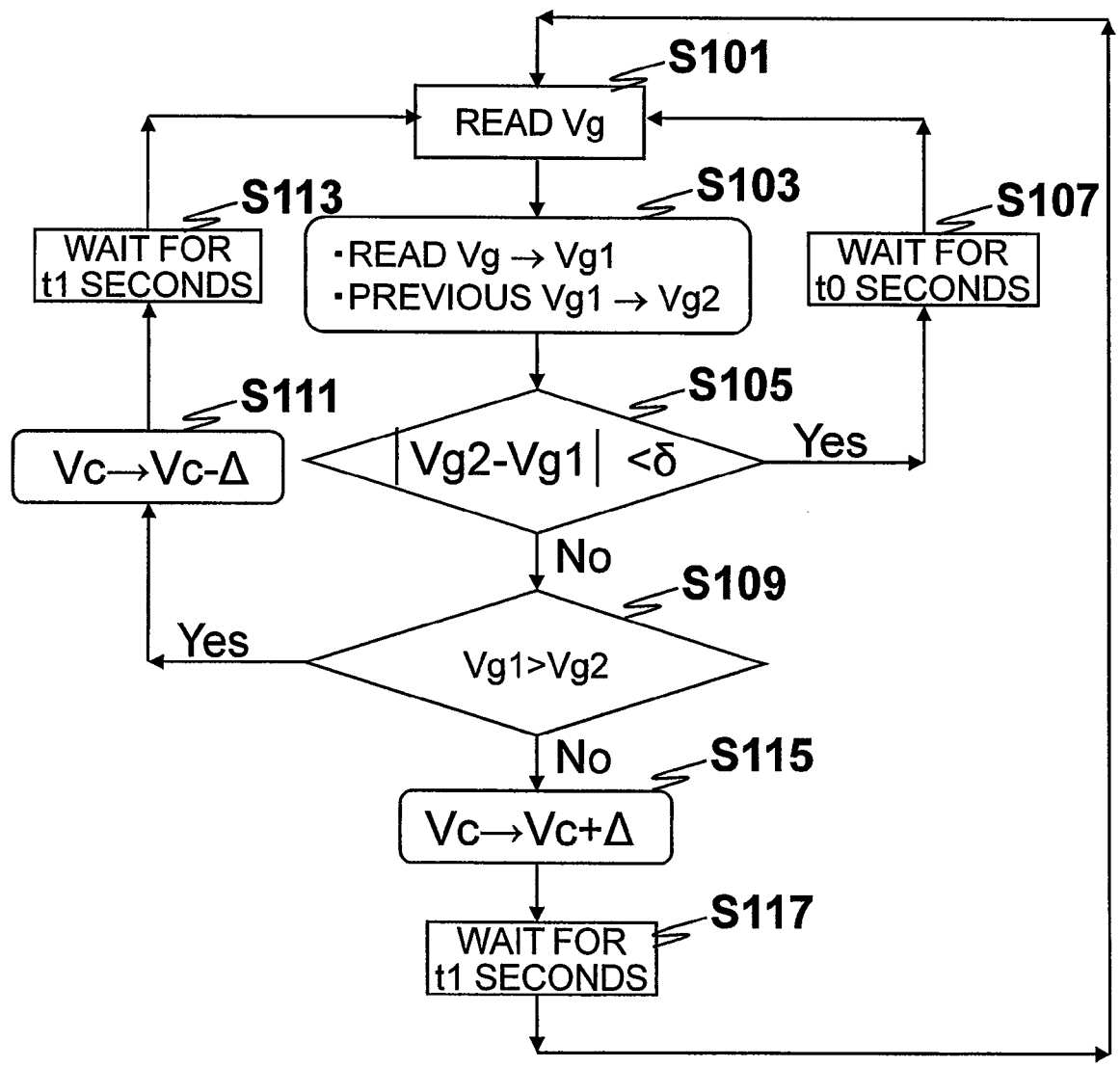
FIG. 7 is a flowchart showing a control algorithm.

FIG. 7 shows a specific algorithm of the controller 49.

First, the controller 49 obtains the value of the DC voltage Vg inputted from the microwave detector 48 (S101). The controller 49 changes a value Vg1 of Vg, which is stored in a memory and is previously read in, to Vg2 (second DC signal), and changes the value of Vg read in at this time to Vg1 (first DC current) (S103). Here, the controller 49 stores Vg1 into the memory. Next, the controller 49 obtains a difference between Vg1 and Vg2, and when the value (absolute value) is smaller than a previously set threshold $\delta$ (S105, Yes), the controller waits previously determined t0 seconds (for example, 10 seconds), and proceeds to the routine (S101) to again read Vg.

On the other hand, when the difference is larger than $\delta$ (S105, No), and when Vg1 is larger than Vg2 (S109, Yes), the controller 49 reduces the control voltage Vc by a specified value $\Delta$ (Vc=Vc$-\Delta$), waits time t1 seconds in which the temperature of the heater 221 of the phase section 22 becomes stable (S111, S113), and shifts to the routine (S101) to again read Vg. When Vg1 is smaller than Vg2 (S109, No), the controller increases the control voltage Vc by $\Delta$ (Vc=Vc+$\Delta$) to raise the temperature of the heater 221 of the phase section 22, waits t1 seconds until it stabilizes (S115, S117), and shifts to the routine to read Vg (S101). The DC voltage Vg is stabilized to the minimum value or its vicinity by the control algorithm. Incidentally, this algorithm is an example, and the algorithm to minimize Vg is not limited to this description. Although the description is made while using the flow of the signal of the I system, this can be similarly applied to the signal of the Q system.

Incidentally, in FIG. 1 of this embodiment, although the delay section 23, 33 and the phase section 22, 32 are shown in different blocks, even if these are integrally formed, the above description is not changed.

2. Second Embodiment

Figure 2:
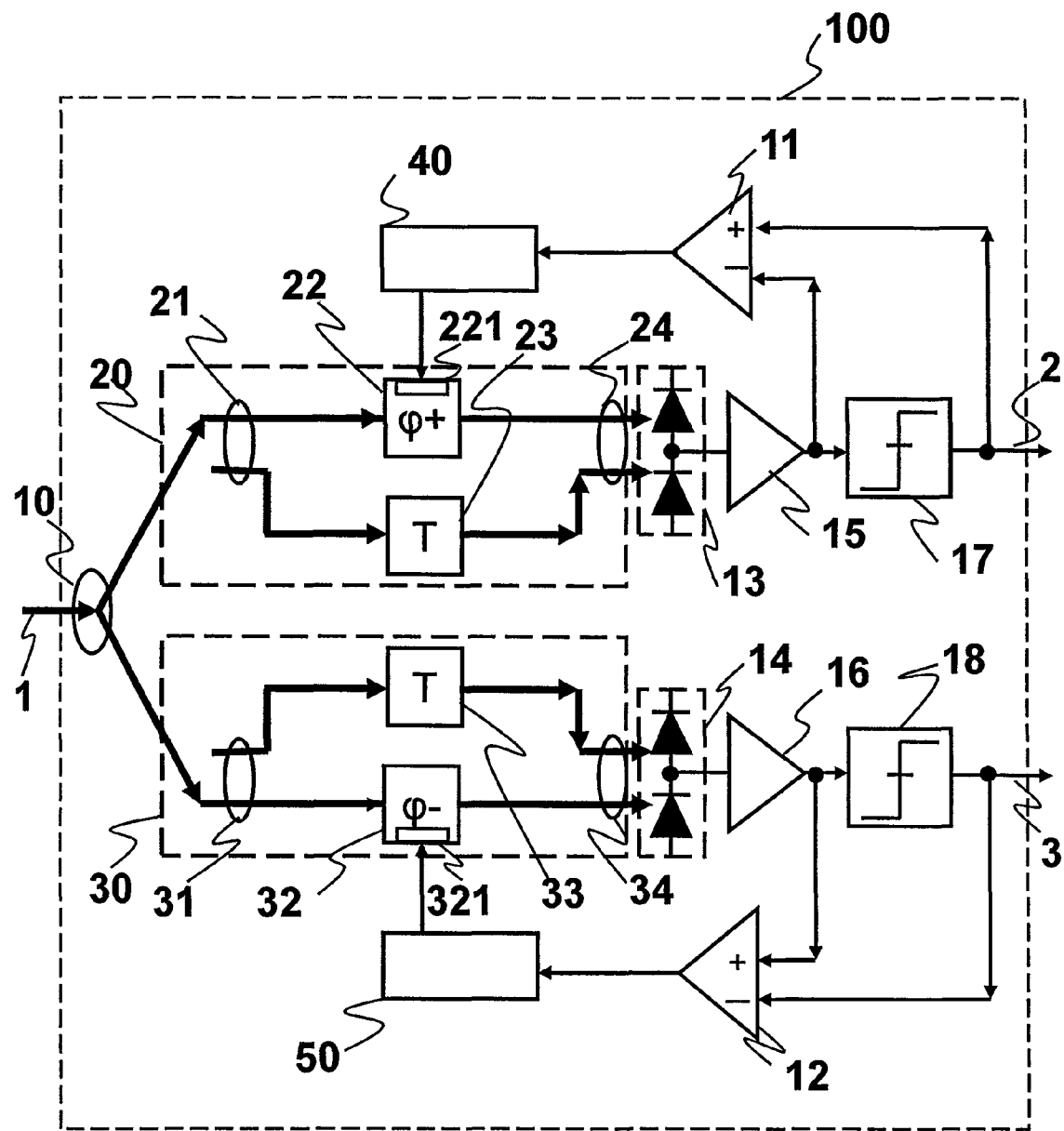
FIG. 2 is a block diagram showing a structure of an optical receiving apparatus of a second embodiment.
Figure 3:
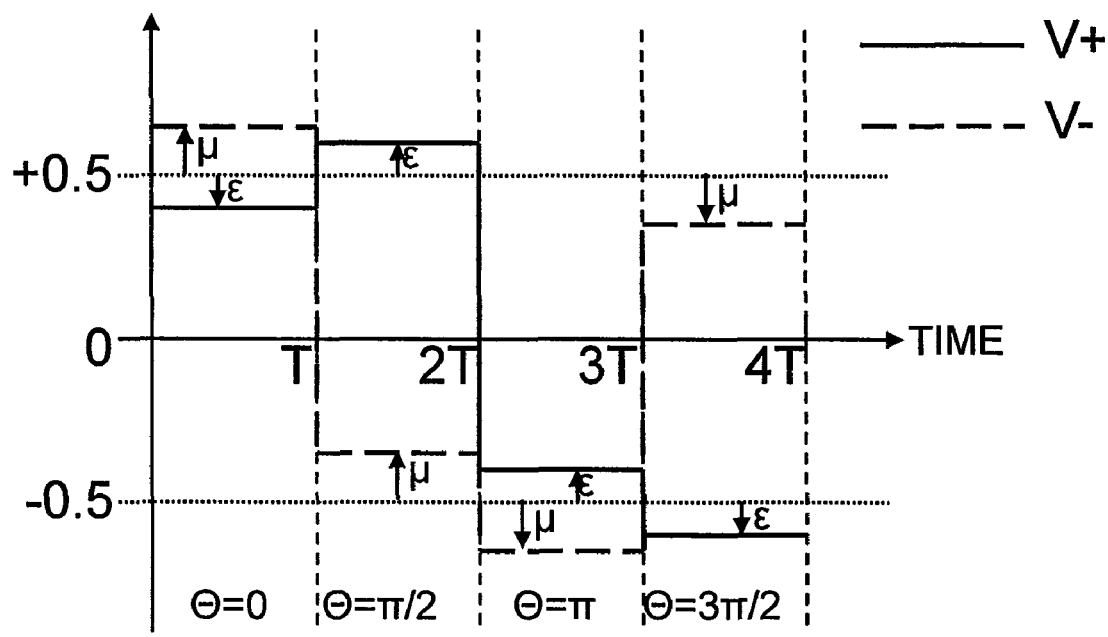
FIG. 3 is an explanatory view of an output of a pre-amplifier in a case where a phase difference between both arms of an optical interferometer is shifted from an optimum value.

FIG. 2 is a structural view of an optical receiving apparatus of a second embodiment.

This embodiment is different from the first embodiment in that phase sections 22 and 32 installed in optical interferometers 20 and 30 are located on arms different from delay sections 22 and 33 to generate a delay time of 1-symbol time. In the first embodiment, the phase section and the delay section are located on the same arm. The other structure of this embodiment, the structure of a control circuit, an algorithm, and wire connection of the inside of the receiving apparatus are the same as those of the first embodiment except for the difference of the arms of the phase sections 22 and 32.

3. Third Embodiment

Figure 8:
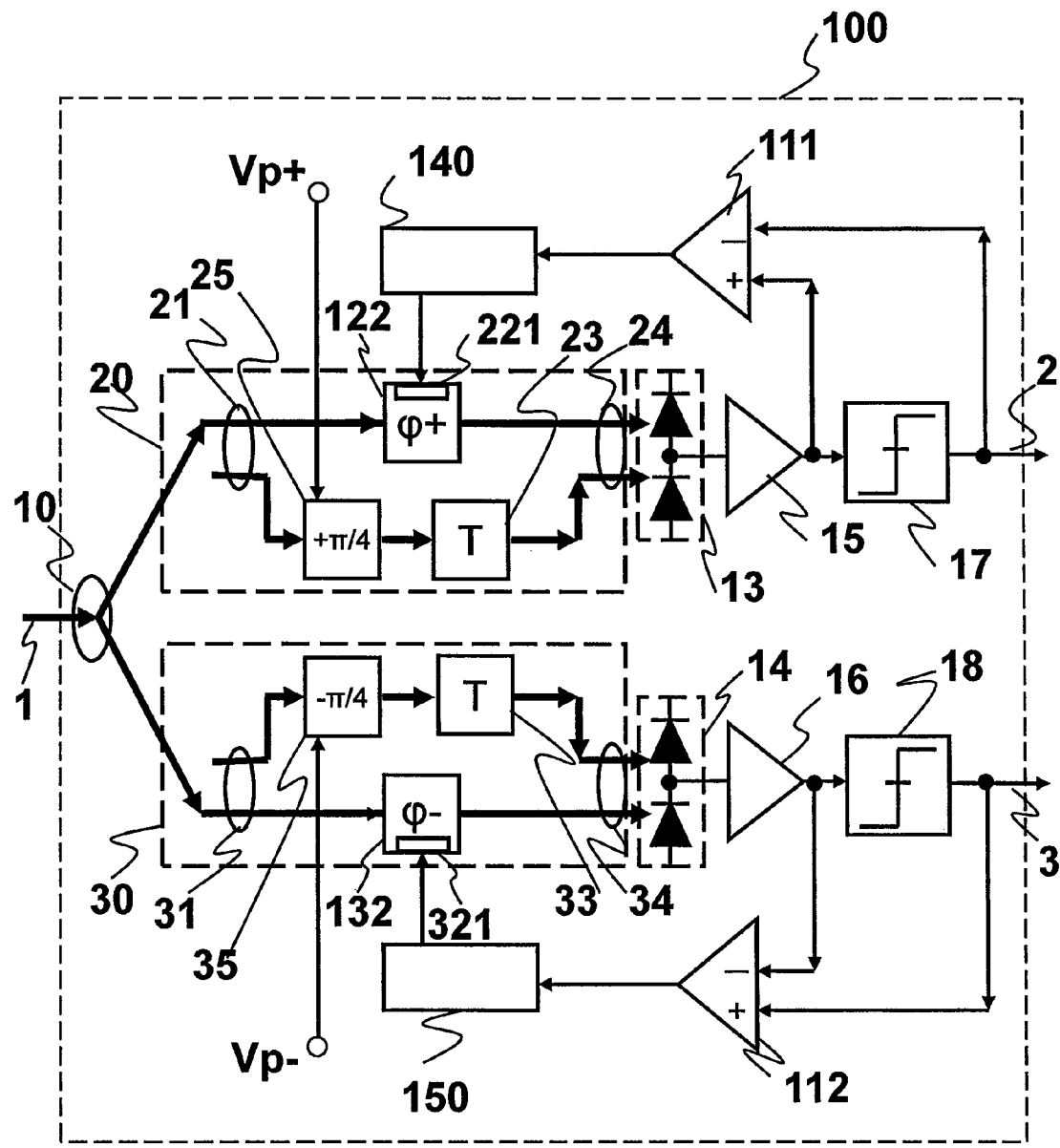
FIG. 8 is a block diagram showing a structure of an optical receiving apparatus of a third embodiment.

FIG. 8 is a structural view of an optical receiving apparatus of a third embodiment.

This embodiment is different from the first embodiment in that the phase sections 22 and 32 of the first embodiment are divided into phase sections 25 and 35 to set $+\pi/4$ and $-\pi/4$ and phase adjustment sections 122 and 132 to correct a shift of a phase difference. The phase adjustment sections 122 and 132 are located on arms different from the phase sections 25 and 35, and are controlled by control circuits 140 and 150. Voltages Vp+ and Vp- are applied to the phase sections 25 and 35 so that the phase differences between both arms of the respective optical interferometers become $+\pi/4$ and $-\pi/4$.

In the case of this structure, when the phase differences between both the arms of the respective optical interferometers 20 and 30 are shifted from $+\pi/4$ and $-\pi/4$, the outputs of pre-amplifiers 15 and 16 are given by following expressions.

[Numerical expression 4]

$$V+=\cos(\theta-\pi/4-\epsilon+\phi+)/\sqrt{2},\ V-=\cos(\theta+\pi/4-\mu+\phi-)/\sqrt{2} \quad (4)$$

Where $\epsilon$ and $\mu$ denote shifts from the optimum values of the phase differences between both the arms of the respective optical interferometers 20 and 30, that is, +π/4 and −π/4, and φ+ and φ− denote phases generated by the phase adjustment sections 122 and 132. From the expression (4), it is understood that φ+ and φ− function in the direction of canceling ε and μ.

A control system of a signal path of an I system will be described. With respect to the input of a differential amplifier for taking a difference between the output of a pre-amplifier 15 and the output of a discriminator 17, wire connection is made opposite to that of the first embodiment by taking it into consideration that φ+ cancels ε. That is, in this embodiment, the wire connection is performed so that the output of the discriminator 17 is subtracted from the output of the pre-amplifier 15. In the signal of the Q system, similarly, the wire connection is made opposite to the first embodiment. That is, the wire connection is performed so that the output signal of the pre-amplifier 16 is subtracted from the output signal of the discriminator 18.

With respect to the control circuits 140 and 150 of this embodiment, since the fixed phase sections 25 and 35 are provided on the outside, a control signal Vc does not include a DC voltage (or current) to generate a fixed phase (+π/4, −π/4). For example, in the structure of FIG. 5, Vp can be omitted. Incidentally, the other structure is similar to the first embodiment.

The present invention can be used for the optical receiving apparatus of the optical fiber communication system.

What is claimed is:

1. An optical receiving apparatus for receiving an optical differential quaternary phase shift keying signal, comprising:
    an optical interferometer that includes a delay section to give a delay time to one arm of two arms through which part of inputted optical differential quaternary phase shift keying signal passes, and a phase section to give a phase difference between signals of the two arms by adjusting a phase of the one arm or the other arm;
    a photoelectric conversion element to convert an optical signal from the optical interferometer into an electric signal and to output the electric signal;
    a discriminator to reproduce a digital signal based on the electric signal and a previously determined threshold and to output the digital signal;
    a difference unit to obtain a difference signal between an input to the discriminator and an output of the discriminator; and
    a control circuit to adjust the phase given by the phase section to reduce an amplitude of the obtained difference signal.

2. The optical receiving apparatus according to claim 1, wherein
    the phase section includes a heater, and
    the control circuit adjusts temperature of the heater of the phase section to adjust the phase difference.

3. The optical receiving apparatus according to claim 1, further comprising
    a pre-amplifier to amplify the signal from the photoelectric conversion element and outputs the signal to the discriminator.

4. The optical receiving apparatus according to claim 1, wherein the control circuit includes
    an oscillator to output a signal of a previously determined frequency,
    a synchronous detection circuit to input the difference signal including an oscillation component of the frequency and to perform synchronous detection based on an output from the oscillator to extract the frequency component from the difference signal,
    a difference circuit to take a difference between a signal to give a previously determined phase difference and an output of the synchronous detection circuit, and,
    an adding circuit to add the difference to the signal from the oscillator to generate a control signal to the phase section.

5. The optical receiving apparatus according to claim 4, wherein the synchronous detection circuit includes
    a mixer to multiply the difference signal by the output of the oscillator, and
    a low-pass filter to filter an output from the mixer at a previously determined frequency.

6. The optical receiving apparatus according to claim 1, wherein the control circuit includes
    a low-pass filter to input the difference signal and to filter the difference signal at a previously determined frequency,
    a microwave detector to convert an output of the low-pass filter into a DC signal, and
    a controller to generate a control signal to the phase section to reduce an output of the microwave detector.

7. The optical receiving apparatus according to claim 6, wherein
    the controller obtains a difference between a first DC signal inputted from the microwave detector in present processing time and a second DC signal in a previous processing time stored in a memory, and
    when the difference is larger than a previously determined threshold, the controller increases or decreases the control signal by a specified value according to a magnitude relation of the first DC signal and the second DC signal.

8. The optical receiving apparatus according to claim 1, wherein
    the phase section and the delay section are provided in a same arm.

9. The optical receiving apparatus according to claim 1, wherein
    the phase section and the delay section are provided in different arms.

10. The optical receiving apparatus according to claim 1, further comprising:
    a second optical interferometer that includes a second delay section to give a delay time to one arm of two arms through which part of the optical differential quaternary phase shift keying signal passes, and a second phase section to give a phase difference between signals of the two arms by adjusting a phase of the one arm or the other arm;
    a branch section that branches the optical differential quaternary phase shift keying signal inputted from a transmission path, outputs one of branched signal to the optical interferometer, and outputs the other to the second optical interferometer;
    a second photoelectric conversion element to convert an optical signal from the second optical interferometer into an electric signal and to output the electric signal;
    a second discriminator to reproduce a digital signal based on a level of the electric signal and output the digital signal;
    a second difference unit to obtain a second difference signal between an input to the second discriminator and an output of the second discriminator; and
    a second control circuit to adjust the phase difference given by the second phase section to reduce an amplitude of the obtained second difference signal.

11. The optical receiving apparatus according to claim 10, wherein the delay times of the delay section and the second delay section are set to be equal to a 1-symbol time of the optical differential quaternary phase shift keying signal, and the optical interferometer and the second optical interferometer are orthogonal to each other.

12. An optical receiving apparatus for receiving an optical differential quaternary phase shift keying signal, comprising:

an optical interferometer that includes a delay section to give a delay time to one arm of two arms through which part of inputted optical differential quaternary phase shift keying signal passes, a phase section to give a previously determined phase difference between signals of the two arms, and a phase adjustment section to adjust a phase of the signal of the arm different from the phase section;

a photoelectric conversion element to convert an optical signal from the optical interferometer into an electric signal and to output the electric signal;

a discriminator to reproduce a digital signal based on a level of the electric signal and to output the digital signal;

a difference unit to obtain a difference signal between an input to the discriminator and an output of the discriminator; and a control circuit to adjust the phase given by the phase section to reduce an amplitude of the obtained difference signal.

* * * * *